United States Patent
Chiang et al.

(10) Patent No.: US 8,723,474 B2
(45) Date of Patent: May 13, 2014

(54) ELECTRICAL VEHICLE ENERGY SYSTEM AND OPERATING METHOD THEREOF

(75) Inventors: Yi-Hsien Chiang, Hualien (TW); Wu-Yang Sean, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 246 days.

(21) Appl. No.: 13/103,515

(22) Filed: May 9, 2011

(65) Prior Publication Data

US 2012/0150372 A1    Jun. 14, 2012

(30) Foreign Application Priority Data

Dec. 14, 2010    (TW) ................................ 99143647 A

(51) Int. Cl.
*H02J 7/14*     (2006.01)
*H02J 7/00*     (2006.01)

(52) U.S. Cl.
USPC ............ 320/103; 320/104; 320/167; 320/126

(58) Field of Classification Search
USPC ................. 320/103, 104, 167, 109, 126, 127; 180/65.1–65.29; 903/903, 904, 907; 701/22
See application file for complete search history.

(56) References Cited

U.S. PATENT DOCUMENTS

| | | | |
|---|---|---|---|
| 4,672,294 A | 6/1987 | Norton | |
| 5,316,868 A | 5/1994 | Dougherty et al. | |
| 5,463,294 A | 10/1995 | Valdivia et al. | |
| 5,549,984 A | 8/1996 | Dougherty | |
| 5,619,107 A * | 4/1997 | Shinohara et al. | 318/139 |
| 5,642,270 A | 6/1997 | Green et al. | |
| 6,057,666 A | 5/2000 | Dougherty et al. | |
| 6,373,219 B1 | 4/2002 | Obara et al. | |

(Continued)

FOREIGN PATENT DOCUMENTS

| | | |
|---|---|---|
| TW | I272212 | 2/2007 |
| TW | 200815231 | 4/2008 |
| TW | I295643 | 4/2008 |
| TW | 2008191964 | 5/2008 |

OTHER PUBLICATIONS

Jian Cao and Ali Emadi, A New Battery/Ultra-Capacitor Hybrid Energy Storage System for Electric, Hybrid and Plug-in Hyrbrid Electric Vehicles, 2009, IEEE, pp. 941-946.*
English Abstract of TW I295643.

(Continued)

*Primary Examiner* — Drew A Dunn
*Assistant Examiner* — Michael Dibenedetto
(74) *Attorney, Agent, or Firm* — Wang Law Firm, Inc.; Li K. Wang; Stephen Hsu

(57) ABSTRACT

An electric vehicle energy system is provided. The electrical vehicle energy system includes an electrical control unit used for producing the electric vehicle mode according to the external input signals. The electrical vehicle energy further includes an energy storage system used for producing a motor control signal according to an electric vehicle mode. The power loop structure includes at least a first power module and a second power module. The structure further includes at least a first detector and a second detector used for producing a first detecting signal and a second detecting signal according to the first power module and the second power module. The power loop structure further includes an energy storage controller used for producing the plurality of switch control signals according to the electric vehicle mode, the first detecting signal and the second detecting signal through a control area network by a voltage-difference hysteresis operation.

18 Claims, 9 Drawing Sheets

(56) References Cited

U.S. PATENT DOCUMENTS

| | | | |
|---|---|---|---|
| 6,385,522 B1 | 5/2002 | Pugh | |
| 6,650,091 B1* | 11/2003 | Shiue et al. | 320/166 |
| 6,744,237 B2 | 6/2004 | Kopf et al. | |
| 7,186,473 B2* | 3/2007 | Shiue et al. | 429/7 |
| 7,193,390 B2* | 3/2007 | Nagai et al. | 320/116 |
| 7,258,183 B2* | 8/2007 | Leonardi et al. | 180/65.1 |
| 7,412,310 B2* | 8/2008 | Brigham et al. | 701/22 |
| 7,489,048 B2 | 2/2009 | King et al. | |
| 7,692,411 B2* | 4/2010 | Trainor et al. | 320/166 |
| 8,013,548 B2* | 9/2011 | King et al. | 318/139 |
| 8,210,145 B2* | 7/2012 | Handa et al. | 123/179.3 |
| 2005/0257977 A1 | 11/2005 | Kamiya | |
| 2007/0158118 A1* | 7/2007 | King | 180/65.1 |
| 2008/0218104 A1* | 9/2008 | Lukic et al. | 318/139 |
| 2008/0298785 A1 | 12/2008 | Patel et al. | |
| 2009/0179613 A1* | 7/2009 | Masho | 320/103 |
| 2010/0007306 A1 | 1/2010 | Fukui et al. | |
| 2010/0065354 A1 | 3/2010 | Sakuma | |
| 2011/0084648 A1* | 4/2011 | Cao et al. | 320/103 |

OTHER PUBLICATIONS

English Abstract of TW I272212.
English Abstract of TW 200819164.
English Abstract of TW 200815231.
"A New Battery/Ultra-Capacitor Hybrid Energy Storage System for Electric, Hybrid and Plug-in Hybrid Electric Vehicles"; Jian Cao and Ali Emadi; IEEE 2009.
"The Dynamic Control of Hybrid Energy Storage System for Mild HEV"; Baek-Haeng Lee et al.; IEEE 2007.
"Energetic Macroscopic Representation Based Modeling and Control for Battery/Ultra-capacitor Hybrid Energy Strorage[sic] System in HEV"; Haifeng Yu et al.; 2009 IEEE.

* cited by examiner

| switch control signals | | | control mode |
|---|---|---|---|
| S1 | S2 | S3 | |
| 0 | 0 | 0 | I |
| 0 | 0 | 1 | CS2 |
| 0 | 1 | 0 | CS1-2 |
| 0 | 1 | 1 | II-1 |
| 1 | 0 | 0 | CS1-1 |
| 1 | 0 | 1 | II-2 |
| 1 | 1 | 0 | III |
| 1 | 1 | 1 | CS3 |

FIG. 2d

ELECTRICAL VEHICLE ENERGY SYSTEM AND OPERATING METHOD THEREOF

CROSS REFERENCE TO RELATED APPLICATION

This Application claims priority of Taiwan Patent Application No. 099143647, filed on Dec. 14, 2010, the entirety of which is incorporated by reference herein.

BACKGROUND

Technical Field

The present disclosure relates to an electric vehicle energy system and operating system thereof.

Hybrid electric vehicles with a nickel-metal-hydride battery (NiMH battery) or those with a lithium ion battery are already being mass produced. Generally, batteries are used at 40% to 60% depth of discharge so that the batteries may have a longer life (more than 3000 times of charging-discharging). However, the depth of discharge of electric vehicle batteries is about 80%. When electric vehicles are driven in a high speed mode without assisted power sources, their battery modules provide all the power to the motors. Thus, the battery modules have to absorb power surges in the regeneration mode of electric vehicles. Accordingly, battery life will enormously be damaged. Therefore, super capacitors connected to electric vehicle batteries are used to share battery discharge-charge current to lower the depth of discharge to prolong battery life.

Another way to prolong battery life is to reduce working temperature of battery modules. For this reason, a radiant heat system including an air cooling and water cooling system is necessary. However, radiant heat efficiency is not consistent due to many limitations of the environment such as working space or air flow conditions etc.

There are many conventional technical disclosures about electric vehicle energy systems and operating methods thereof. For example, U.S. Pat. No. 6,744,237 discloses a hybrid system for an electric vehicle. The disclosed system can not execute power regeneration. U.S. Pat. No. 7,186,473 discloses a battery with built-in load leveling. The patent discloses that two discharge-charge units including controllers are integrated into a cell unit including super capacitors and lithium ion batteries to reduce battery discharge current to raise battery power density and battery life.

U.S. Pat. No. 7,489,048 discloses an energy storage system for an electric or a hybrid vehicle. The patent discloses a circuit used for switching two cell modules to be series connected or parallel connected a storage device and a cell load level system used for adjusting regeneration power. The National Renewable Energy Laboratory (NREL) disclosed that the life of lead-acid batteries with an intermittent charging method can be prolonged by three times that of its original life. The principle used is that temporary rest periods can make the spreading out of the internal heat of batteries over a time period more balanced such that charging reaction of batteries can be finished, thereby reducing chemical products which deteriorate batteries.

However, the conventional intermittent method can be only executed during a battery charging period. The flow of electric vehicle current can not be stopped when driving. Thus, battery life is shortened.

SUMMARY

A detailed description is given in the following embodiments with reference to the accompanying drawings.

In one embodiment, the disclosure provides an electric vehicle energy system. The electrical vehicle energy system includes an electrical control unit used for producing the electric vehicle mode according to the external input signals. The electrical vehicle energy further includes an energy storage system used for producing a motor control signal according to an electric vehicle mode and used for controlling a power loop structure. The power loop structure includes at least a first power module and a second power module. The structure further includes at least a first detector and a second detector, coupled to the first power module and the second power module used for producing a first detecting signal and a second detecting signal respectively according to the first power module and the second power module. The power loop structure further includes an energy storage controller coupled to the electrical control unit for producing the plurality of switch control signals according to the electric vehicle mode, the first detecting signal and the second detecting signal through a control area network (CAN) by a voltage-difference hysteresis operation.

In another embodiment, the disclosure provides a method for operating an electric vehicle energy system. The method includes: producing the electric vehicle mode according to the external input signals by an electronic control unit; producing a first detecting signal and a second detecting signal respectively by a first detector and a second detector; producing the plurality of control signals according to the electric vehicle mode, the first detecting signal and the second detecting signal using a voltage-difference hysteresis operation by an energy storage controller; and intermittently providing power or regenerating power according to a plurality of switch control signals by at least a first power module and a second power module.

The system and the method of the disclosure employ two similar power modules which are connected in parallel, wherein a super capacitor and a battery are connected in series to respectively provide half working voltage. Thus, a detector control method is used to prevent voltages of super capacitors from fluctuating.

Furthermore, battery modules intermittently charge and discharge so that battery working temperature can be substantially lowered such that battery life can be prolonged. Moreover, a method to equalize battery voltages while regenerating power due to vehicle braking by controlling switches is implemented according to the disclosure. The battery effective capacity can be raised by reducing voltage differences of the serial connected batteries since the over-voltage protection mechanism would be activated early due to a large voltage difference when the batteries are charged, so would be activated early the under-voltage protection mechanism when the batteries are discharged.

Therefore, in this case battery life can be prolonged and battery capacity can be increased.

BRIEF DESCRIPTION OF DRAWINGS

The present disclosure can be more fully understood by reading the subsequent detailed description and examples with references made to the accompanying drawings, wherein:

FIG. 2d is a table showing the relationship between the logic combination of the switch control signals and the control mode of the electric vehicle energy system;

DETAILED DESCRIPTION OF DISCLOSED EMBODIMENTS

The following description is of the best-contemplated mode of carrying out the disclosure. This description is made for the purpose of illustrating the general principles of the disclosure and should not be taken in a limiting sense. The scope of the disclosure is best determined by reference to the appended claims.

Figure 1:
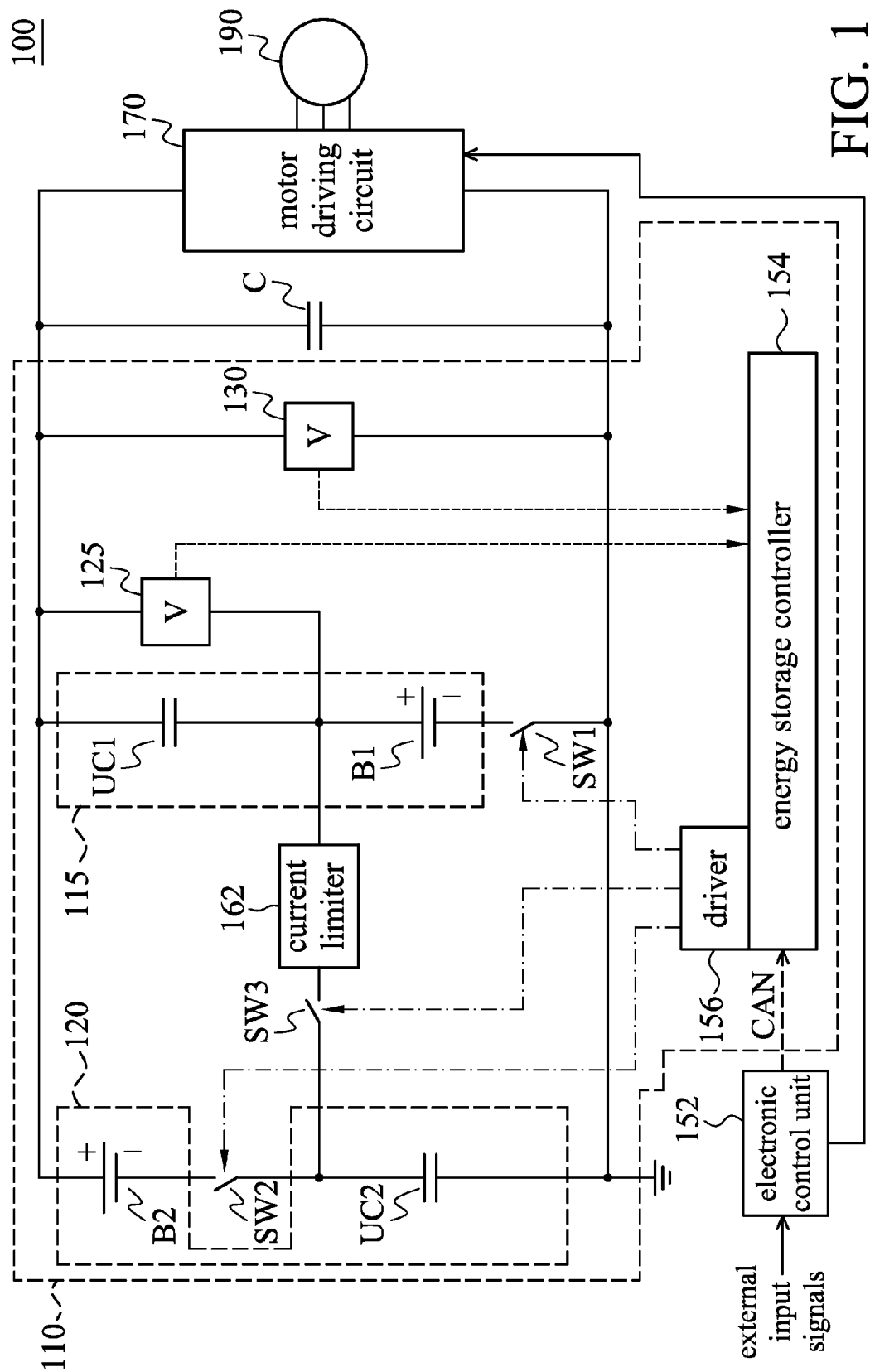
FIG. 1 is a diagram showing an electric vehicle energy system of the disclosure.

FIG. 1 is a diagram showing an electric vehicle energy system of the disclosure. The electric vehicle energy system 100 includes an energy storage system 110, an electronic control unit 152, a motor driving circuit 170, an electrolysis capacitor C and a motor 190.

In the embodiment, the energy storage system 110 further includes a first power module 115, a second power module 120, a first detector 125, a second detector 130, an energy storage controller 154, a driver 156, a first switch SW1, a second switch SW2 and a third switch SW3. In another embodiment, the energy storage system 110 may further include more power modules and detectors.

The motor driving circuit 170 is coupled to the motor 190, and is used to transform a direct current (DC) voltage to an alternating current (AC) voltage to drive the motor 190. The electrolysis capacitor C is connected to the motor in parallel, and is used to absorb DC pulses. In the embodiment, the motor 190 may be a three phase AC motor, but is not limited thereto.

The first power module 115 includes a first battery B1 connected to a first super capacitor UC1 in series, and the second power module 120 includes a second super capacitor UC2 connected to a second battery B2 in series. The first battery B1 is coupled to the second super capacitor UC2 in parallel and the second battery B2 is connected to the first super capacitor UC1 in parallel.

The first power module 115 and the second power module 120 will interchangeably and intermittently provide power or regenerate power according to an electric vehicle modes. The first detector 125 and the second detector 130 may produce a first detecting signal and a second detecting signal such as voltage signals according to the first power module 115 and the second power module 120. In the embodiment, the first detector 125 is coupled to the first super capacitor UC1 and the second detector 130 is coupled to the first power module 115. The first super capacitor UC1 is coupled to the second battery B2 in parallel so that the voltage of the first super capacitor UC1 can be measured according to the first detector. The first battery B1 is coupled to the second super capacitor UC2 in parallel so that the voltage of the first battery B1 and the voltage of the second capacitor UC2 can be calculated according to the two detectors.

The electronic control unit 152 is used to produce electric vehicle mode signals according to outside input signals. The energy storage controller 154 is coupled to the electronic control unit 152 through a control area network (CAN), and may produce switch control signals according to the electric vehicle mode signals, the first detecting signals and the second detecting signals by using voltage-difference hysteresis operation.

The voltage-difference hysteresis operation means that measured individual capacitor voltage (Vc) and battery voltage (Vb) are operated by a differential operation (dV=Vc−Vb) and two hysteresis operations H1 and H2. The purpose of the voltage-difference hysteresis operation is to increase the operation range of intermittent charge-discharge method and prevent the first detector 125 and the second detector 130 from a chattering phenomenon.

Figure 2A:
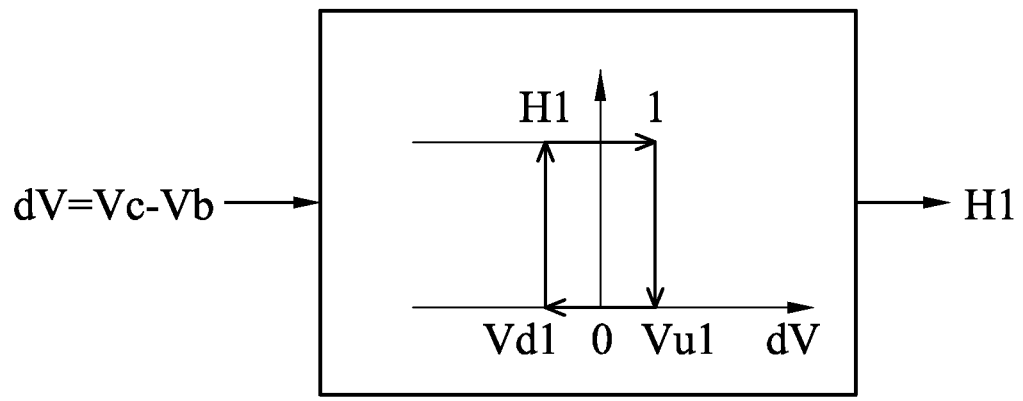
FIG. 2a-2b is a diagram showing the voltage-difference hysteresis operation of the electric vehicle energy system.
Figure 2B:
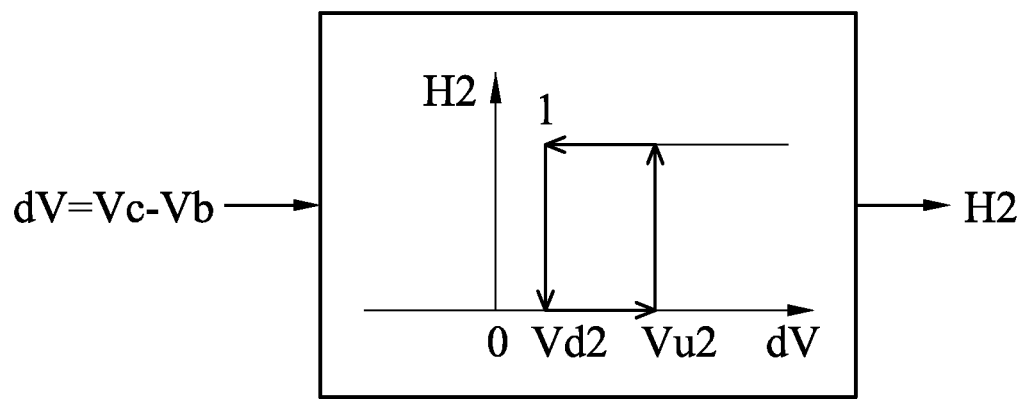

FIG. 2a-2b is a diagram showing the voltage-difference hysteresis operation of the electric vehicle energy system. The voltage Vc 1 of the first super capacitor UC1, the voltage Vc2 of the super capacitor UC2, the voltage Vb1 of the first battery B1 and the voltage Vb2 of the second battery may be measured and calculated according to the first detector 125 and the second detector 130. The energy storage controller 154 will issue control signals or change control signals when the voltage difference dV between the battery voltages Vc and the capacitor voltages Vb is larger than a predetermined positive voltage difference Vu1, or is smaller than a predetermined negative voltage difference Vd1. In another embodiment, the energy storage controller 154 will issue control signals or change control signals when the voltage difference dV between the battery voltages Vc and the capacitor voltages Vb is larger than a predetermined high voltage difference Vu2, or is smaller than a predetermined low voltage difference Vd2.

Refer to FIG. 2a, a hysteresis operation is shown. The input signal is a voltage differential signal dV obtained from a super capacitor and a battery, and the output signal is a logic signal (H1=0 or 1). The upper limitation of the hysteresis operator is Vu1, which is a positive value. The lower limitation of the hysteresis operator is Vd1, which is a negative value. The arrow direction represents a possible trajectory, and the logic rule is explained as follows.

Determination of H1 initial value: when the differential signal dV is larger than Vd1, H1 is logic 0, and when the differential signal dV is smaller than, H1 is logic 1.

When H1 is logic 1: when dV is larger than Vu1 according to regeneration, H1 is changed to logic 0.

When H1 is logic 0: when dV is smaller than Vd1 according to intermittent driving, H1 is changed to logic 1.

Refer to FIG. 2b. In one embodiment, another hysteresis operation is shown. The input signal is a voltage differential signal dV obtained from a supper capacitor and a battery, and the output signal is a logic signal (H2=0 or 1). The upper limitation of the hysteresis operator is Vu2, which is a positive value. The lower limitation of the hysteresis operator is Vd1, which is also a positive value. The arrow direction represents a possible trajectory, and the logic rule is explained as follows.

Determination of H2 initial value: when the differential signal dV is smaller than Vu2, H1 is logic 0, and when the differential signal dV is larger than Vu2, H1 is logic 1.

When H2 is logic 0: when dV is larger than or equal to Vu2 according to intermittent charging, H2 is changed to logic 1.

When H2 is logic 1: when dV is smaller than Vd2 according to parallel circuit energy balance, H2 is changed to logic 0.

Thus, the driver 156 will produce switch driving signals according to switch control signals. The driver 156 may be photo couplers, but is not limited thereto. The driver 156 is used to isolate a DC voltage and a controller circuit, and transform the switch control signals into switch driving signals by photo coupled phenomenon to activate electronic switches in the circuit.

In the embodiment there are three electronic switches. The first switch SW1 is coupled to the first power module 115 and the driver 156 and the second switch SW2 is coupled to the second power module 120 and the driver 156. The third switch SW3 is connected to a current limiter 162 in series and disposed between the first power module 115 and the second power module 120.

The energy storage controller 154 may generate three switch control signals by user-defined modes. The high level (logic 1) means that a switch is turned on, and the low level (logic 0) means that a switch is turned off. Three switches have eight logic combinations. In the embodiment, the energy storage controller 154 forms three control modes according to the electric vehicle modes and voltage-difference hysteresis operation.

The energy storage system 110 provides or absorbs power according to the electric vehicle modes. The control modes are described as follows.

(1) During the driving mode, regeneration energy is stored into the super capacitors to achieve an intermittent charging-discharging function.

(2) After the system completes the charging or the battery modules charge the super capacitor, the super capacitors can be pre-charged to a higher level so as to easily proceed with intermittent operations when the vehicle is being started up.

(3) The voltages of the super capacitors have to be maintained at a level which is close to the voltages of the batteries to prevent working voltages from varying enormously.

Figure 2C:
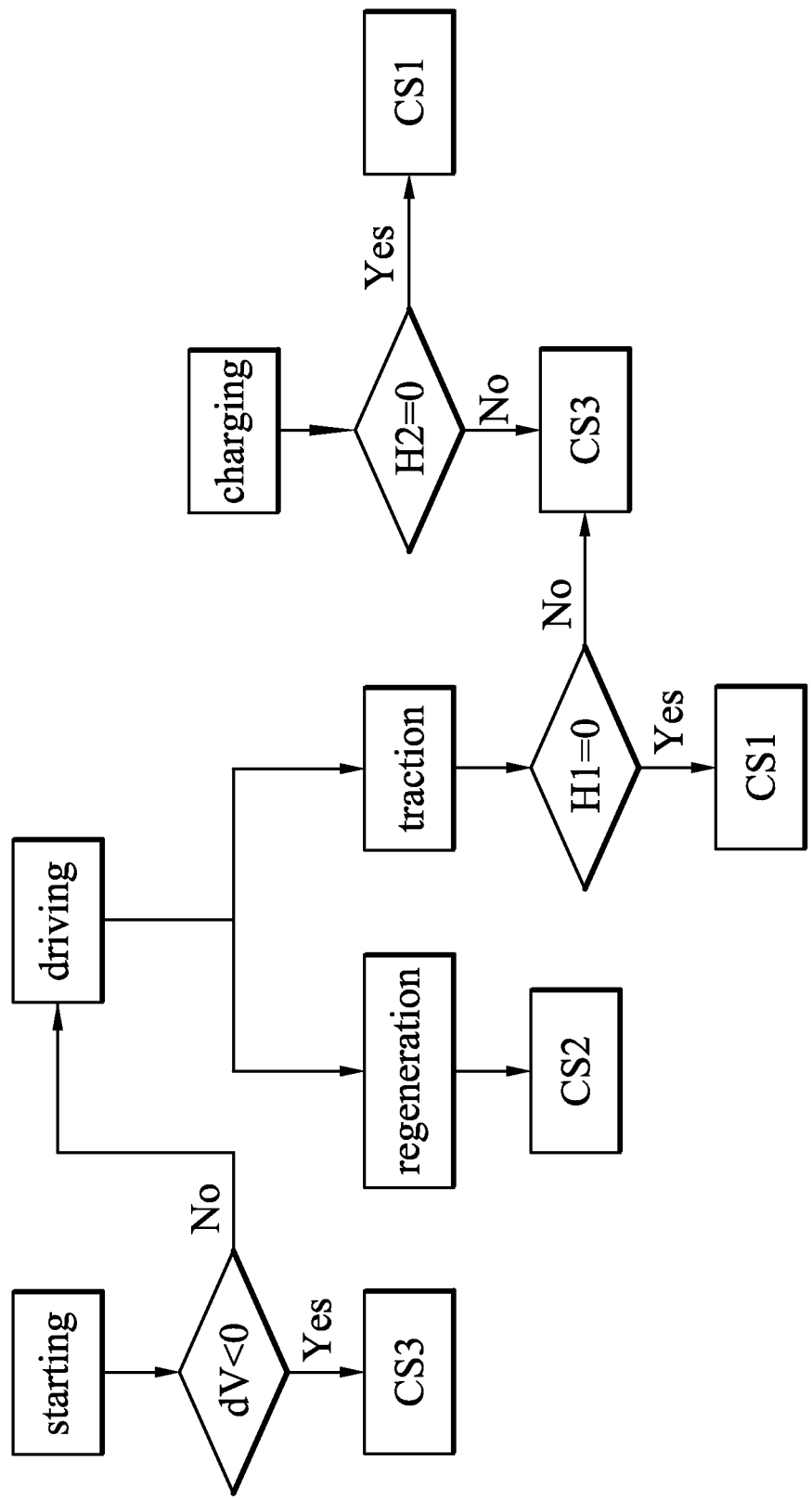
FIG. 2c is a diagram showing the relationship between the voltage-difference hysteresis operation and the electric vehicle mode of the electric vehicle energy system.

Following the above control rules, the control flowchart of the electric vehicle energy system is shown in FIG. 2c. The energy storage controller 154 receives electric vehicle modes from the electronic control unit 152 to determine whether the electric vehicle is starting up, or being driven, or charged. The driving mode can be divided into a traction mode and a regeneration mode. When referring to the control flowchart of FIG. 2c according to the above electric vehicle modes, it is shown that the responding control modes CS1, CS2 and CS3 can be obtained to control the electric switches.

The control modes are made up of switch control signals S1-S3 so that there are eight control combinations as FIG. 2d shows. S1, S2 and S3 are logic signals. A high level 1 means that the responding switch has been turned on, and a low level 0 means that the responding switch has been turned off.

Figure 3A:
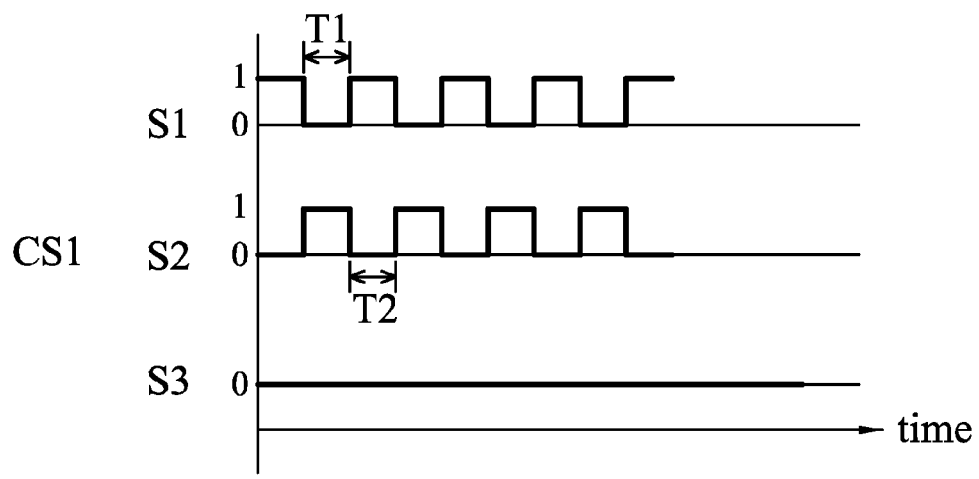
FIG. 3a-3c is a waveform diagram of the switch control signals of the electric vehicle energy system.

During the first control mode CS1, the first control mode CS1 is made up of CS1-1 and CS1-2. In other words, signal S1 and signal S2 are pulse width modulation signals, which have 180 degree phase differences. Their working duties are equal (T1=T2) as FIG. 3a shows.

Figure 3B:
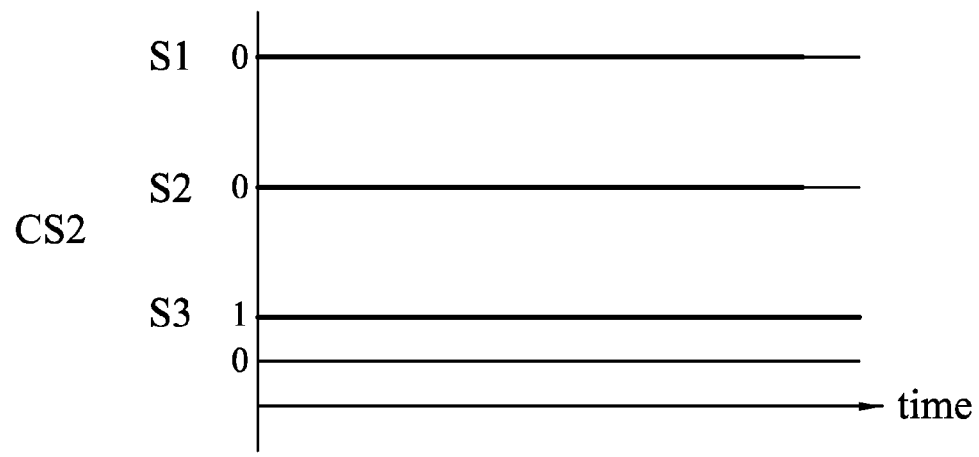

During the second control mode CS2, signals S1 and S2 are at low levels, and signal S3 is at a high level, as FIG. 3b shows.

Figure 3C:

During the three control mode CS3, signals S1 to S3 are high level, as FIG. 3c shows.

For control mode I, the signals S1 to S3 are all at low levels so that their corresponding switches are turned off such that there is no power supplied. Therefore, there is no energy usage mode so that the control mode in the embodiment can be eliminated.

For control mode II-1 and II-2, the control modes will cause the three switches to turn on such that a battery is directly connected to a super capacitor in parallel so that another super capacitor connected to the battery in series is over-discharged. Therefore, the two control modes are not used in the embodiment.

For control mode III, the two power modules in parallel supply power or are charged. This control mode is not used because the voltages of the super capacitors can not be controlled during charging and discharging operations.

Refer to FIG. 2c, in the embodiment, when the electric vehicle is in the starting up mode and the voltage difference dV between the super capacitors UC and the batteries B is smaller than zero, the switch control signals of the third control mode CS3 are generated.

When the electric vehicle mode is in the driving mode and H1 is at a high level or is not at a low level (H1=1), the switch control signals of the third control mode CS3 are generated, and when H1 is at a low level (H1=0), the switch control signals of the first control mode CS1 are generated.

When the electric vehicle is in the charging mode and H2 is at a low level (H1=0), the switch control signals of the first control CS1 are generated, and when H2 is at a high level or not at a low level (H1=1), the switch control signals of the third control mode are generated.

When the electric vehicle mode is in the regenerating mode, the switch control signals of the second control mode CS2 are generated.

FIG. 3a-3c is a waveform diagram of the switch control signals of the electric vehicle energy system. In the embodiment, the first control mode CS1 means that the first switch SW1 is turned on during period T2 and is turned off during period T1, and the second switch SW2 is turned off during period T2 and is turned on during period T1. Furthermore, the duration time of the first switch SW1 and the second switch SW2 is equal. The third switch SW3 is permanently turned off. Hence, the first power module 115 and the second power module 120 interchangeably and periodically provide power. That is, if the first power module 115 provides power, then the second power module 120 does not provide power, and vice versa.

The second control mode CS2 means that the first switch SW1 and the second switch SW2 are permanently turned off (corresponding switch control signals S1 and S2 are both at a low level), the third switch SW3 is permanently turned on (corresponding switch control signal S3 is at a high level) so that the power from the loads charges the first super capacitor UC1 and the super capacitor UC2.

The third control mode CS3 means that the first switch SW1, the second switch SW2 and the third switch SW3 are permanently turned on (corresponding switch control signals S1, S2 and S3 are at high levels) such that the first battery B1 and the second battery B2 charge the second super capacitor UC2 and the first super capacitor UC1.

Figure 4:
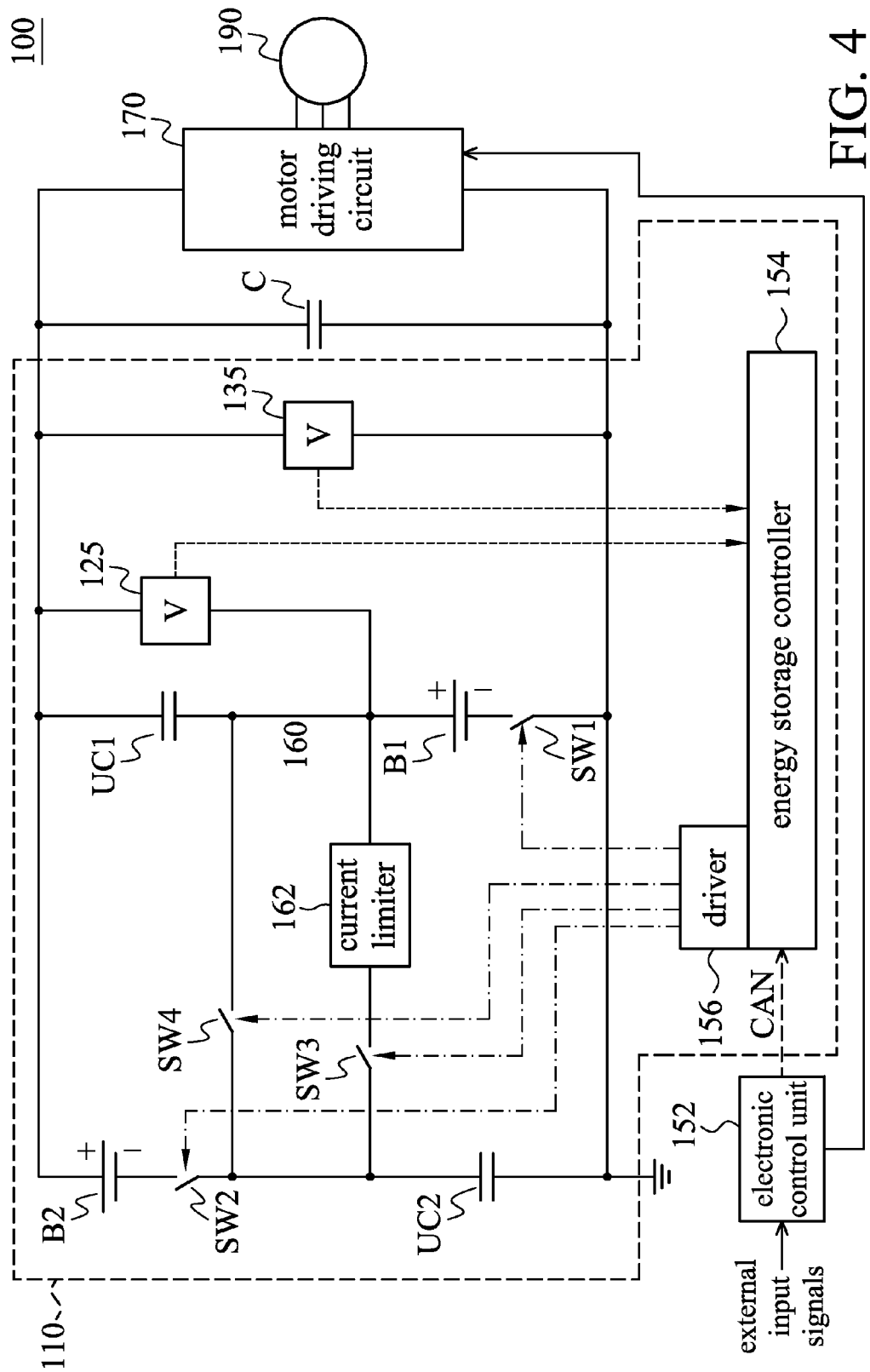
FIG. 4 is a diagram showing another embodiment of the electric vehicle energy system of the disclosure.

Refer to FIG. 1, wherein the electric vehicle energy system 100 further includes a current limiter 162 disposed between the first power module 115 and the second power module 120. The third switch SW3 is turned on during the starting mode, the driving mode or the regeneration mode according to the switch control signal S3 of the second control mode or the third control mode such that the current limiter 162 can restrict current flowing through the second super capacitor UC2, the third switch SW3 and the first super capacitor UC1. In another embodiment, as FIG. 4 shows, the electric vehicle energy system 110 further includes a fourth switch SW4. The current limiter 162 and the third switch SW3 are disposed between the first power module 115 and the second power module 120. When the electric vehicle is starting up, and the voltage difference between the first super capacitor UC1 and the second battery B2 is too large (Vd<Vd1), such that a large current may be produced on them. Hence, the third switch SW3 is only turned on according to the switch control signals of the third control mode CS3 during the starting mode such that the current flowing through the second super capacitor UC2, the third switch SW3 and the first super capacitor UC1 can be restricted by the current limiter 162. The fourth switch SW4 is connected to the current limiter 162 and the third switch SW3 in parallel. During a non-starting mode, the generated current is smaller so that the fourth switch SW4 is turned on according to the switch control signals CS4 (not shown) of the non-third control mode CS3 such that current can flow through the fourth switch SW4 rather than flow through the current limiter 162 and the third switch SW3.

Figure 5A:
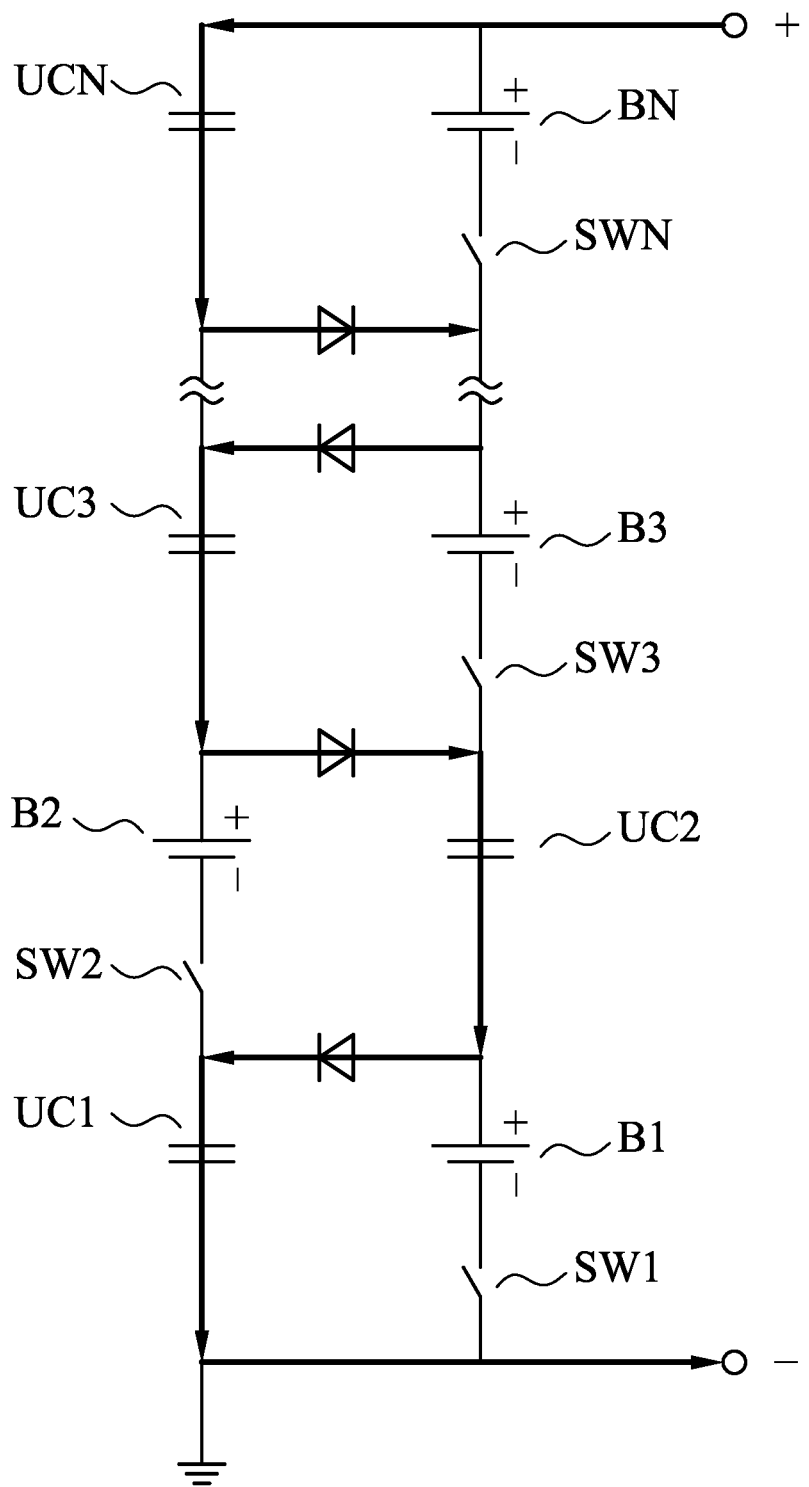
FIG. 5a-5b is a diagram showing the equivalent function of the electric vehicle energy system of the disclosure.
Figure 5B:
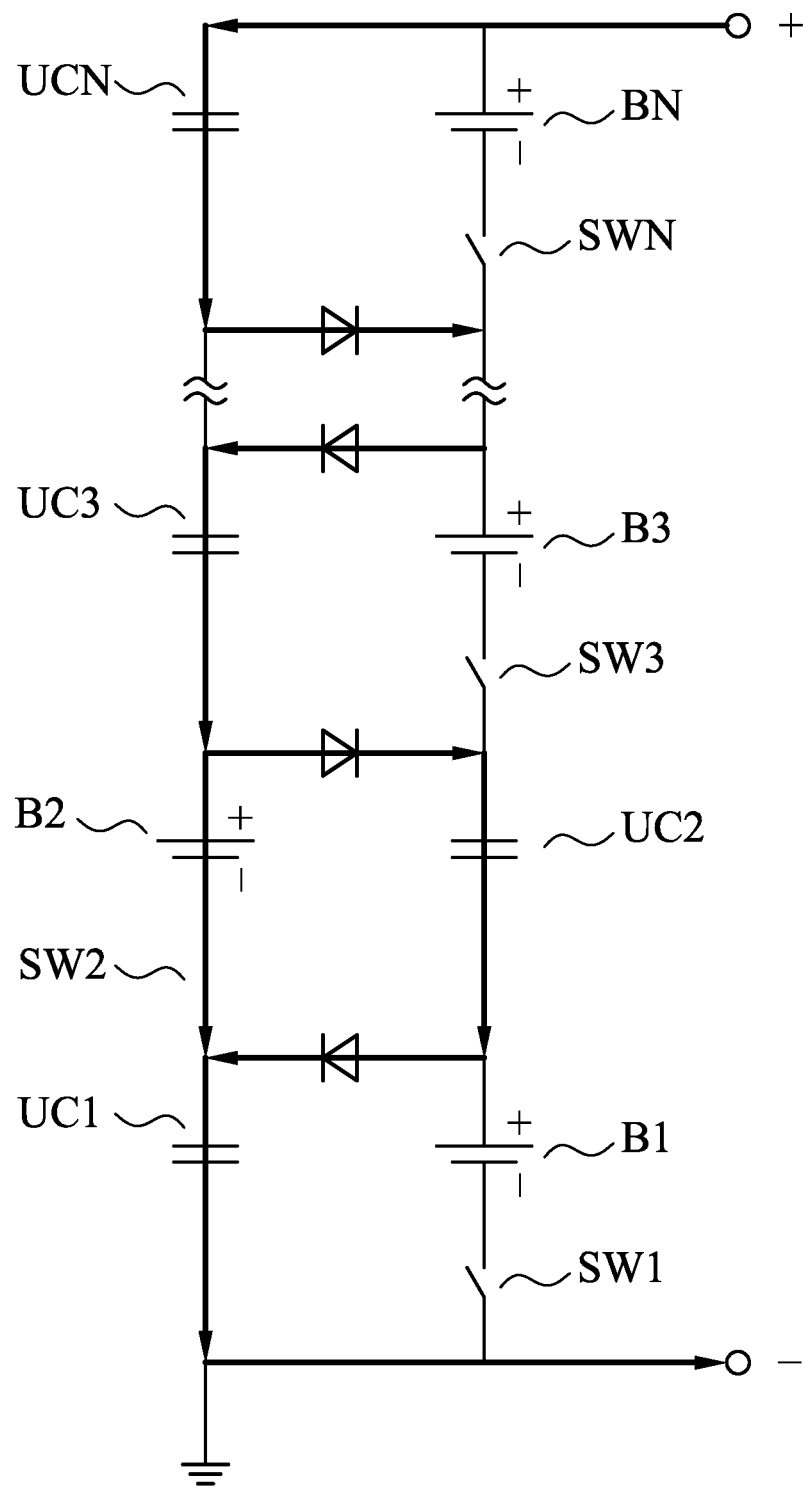

FIG. 5a-5b is a diagram showing the equivalent function of the electric vehicle energy system of the disclosure. The battery unit equalization process is carried out during the regeneration mode. Generally, in the regeneration mode, all the switches SW are turned off, power energy charges all the super capacitors UC rather than the batteries B. The corresponding switch of the weakest battery (the lowest voltage) is usually turned on to carry out battery equalization, as FIG. 5b shows. When the battery energy is recovered to an average level, all the switches are turned off, as the FIG. 5a shows. In the embodiment, the switches may be IGBT, or MOSFET, but are not limited thereto.

Figure 6:
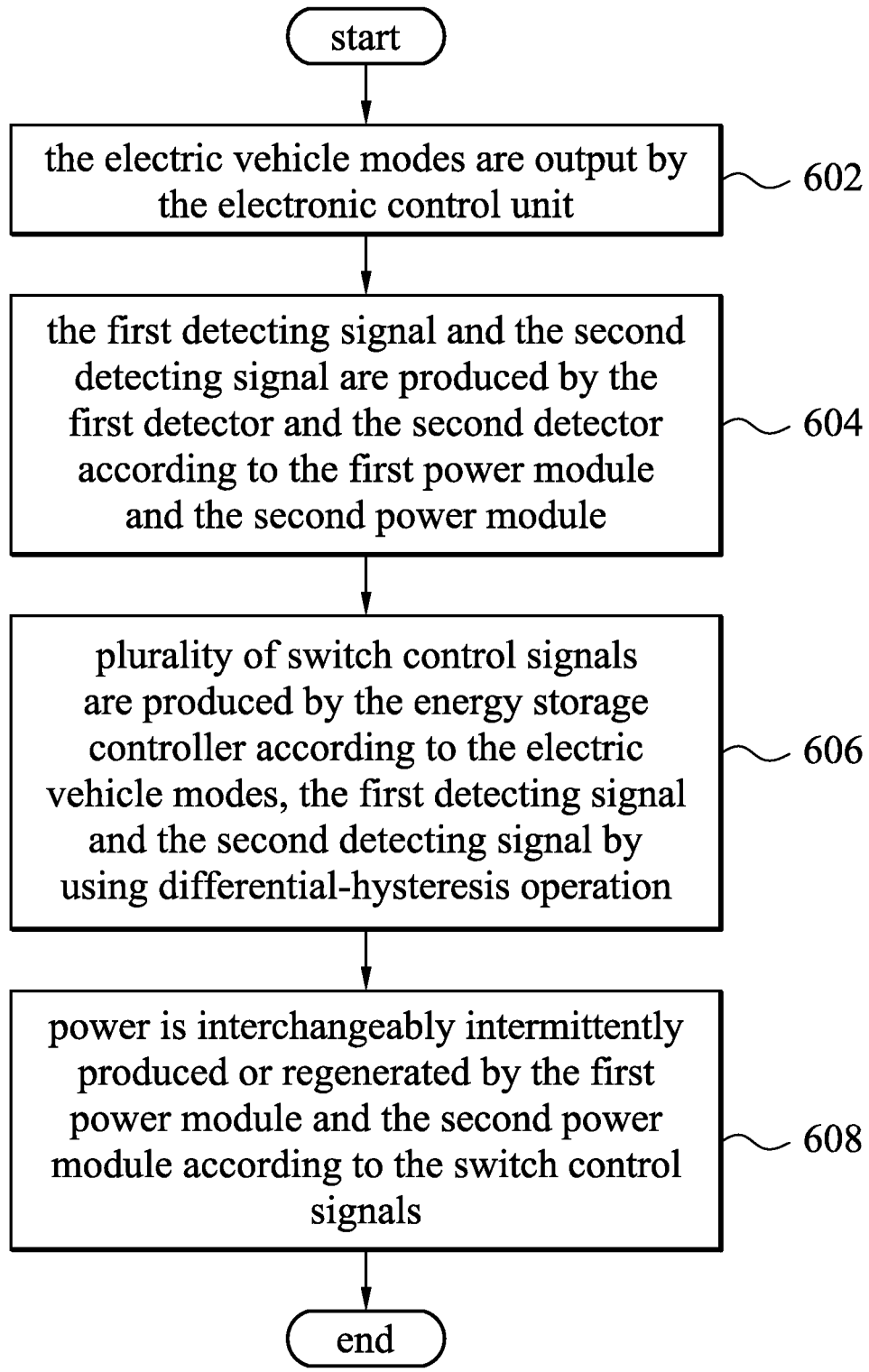
FIG. 6 is a flowchart showing the method for operating an electric vehicle energy system of the disclosure.

FIG. 6 is a flowchart showing the method for operating an electric vehicle energy system of the disclosure. In step 602, the electronic control unit outputs the electric vehicle modes. In the embodiment, the electric vehicle modes include the driving mode, the regeneration mode, the starting mode and the charging mode.

In step 604, the first detecting signal and the second detecting signal are produced by the first detector and the second detector according to the first power module and the second power module. In the embodiment, the first detecting signal and the second detecting signal are voltage signals. The first detecting signal is the voltage signal of the first super capacitor UC1, and the second detecting signal is the voltage signal of the first power module. The first super capacitor UC1 is coupled to the second battery in parallel so that the voltage of the first super capacitor can be measured according to the first detecting signal. The first battery is coupled to the second super capacitor UC2 in parallel so that the voltage of the first battery and the voltage of the second super capacitor can be measured according to the two detecting signals.

In step 606, a plurality of switch control signals are produced by the energy storage controller according to the electric vehicle modes, the first detecting signal and the second detecting signal by using a voltage-difference hysteresis operation. The voltage-difference hysteresis operation means that a measured individual capacitor voltage (Vc) and battery voltage (Vb) are operated by a differential operation (dV=Vc−Vb) and hysteresis operation H1 and H2. The purpose of the voltage-difference hysteresis operation is to increase the operation range of intermittent charge-discharge method and prevent the first detector and the second detector from a chattering phenomenon. The voltage-difference hysteresis operation has been explained previously according to FIG. 2a-2b. Refer to FIG. 2c, when the electric vehicle energy system is in a driving mode, the energy storage controller produces the switch control signals of the first control mode or the third control mode according to the voltage-difference hysteresis operation. When the electric vehicle energy system 100 is in the regeneration mode, the energy storage controller produces the switch control signals of the second control mode. In the starting mode, the energy storage controller will determine to produce the switch control signals of the third control mode or enter to the driving mode according to the voltage difference between the first capacitor voltage (Vc) and the battery voltage (Vb). When the electric vehicle energy system is in the regeneration mode, the energy storage controller produces the switch control signals of the first control mode or the third control mode according to the voltage-difference hysteresis operation.

In step 608, power is interchangeably and intermittently produced or regenerated by the first power module and the second power module according to the switch control signals. When the energy storage system decides to use the first control mode, the energy storage controller facilitates the first power module and the second power module to periodically and interchangeably provide power according to the switch control signals of the first control mode. Refer to FIG. 3a, wherein the first control mode means that the switch control signals S1 and S2 are pulse modulation signals which have 180 degree phase differences and the two signals have equal working duties (T1=T2). The switch control signal S3 is at a low level. Also, the switch control signals control the driver to drive the first switch, the second switch and the third switch such that the first switch and the second switch are interchangeably turned on and off, and the third switch is permanently turned off. Therefore, the first power module and the second power module interchangeably provide power.

When the energy storage system 110 decides to carry out the second control mode, the first power module and the second power module regenerate power according to the switch control signals of the second control mode. Refer to FIG. 3b, wherein the driver produces the driving control signals to control the first, the second and the third switch according to the switch control signals of the second control mode. The second control mode means that the first switch and the second switch are permanently turned off (the corresponding switch control signals S1 and S2 are at low levels). Therefore, the power from the loads charges the first super capacitor and the second super capacitor.

When the energy storage system decides to use the third control mode, the energy storage control turns on the first switch, the second switch and the third switch according to the switch control signals of the third control mode such that the first battery and the second battery charge the second super capacitor and the first super capacitor.

Furthermore, the current limiter is activated by the switch control signals in the second control mode or the third control mode to restrict the current flowing through the first super capacitor and the second super capacitor.

Refer to FIG. 4, in another embodiment; the fourth switch is connected to the current limiter and the third switch in parallel. The electric energy system activates the third switch and the current limiter in the starting mode to restrict battery current within a maximum tolerant range, such as within 125 A, but is not limited thereto. In a non-starting mode, the fourth switch is turned on such that current flows through the fourth switch rather than through the current limiter and the third switch.

While the disclosure has been described by way of example and in terms of the preferred embodiments, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electric vehicle energy system, comprising:
an electrical control unit, for producing an electric vehicle mode according to the external input signals;

an energy storage system, for producing a motor control signal according to the electric vehicle mode, used for controlling a power loop structure, wherein the power loop structure comprises:
at least a first power module and a second power module;
at least a first detector and a second detector, coupled to the first power module and the second power module, for producing a first detecting signal and a second detecting signal respectively according to the first power module and the second power module; and
an energy storage controller, coupled to the electrical control unit, for producing the plurality of switch control signals according to the electric vehicle mode, the first detecting signal and the second detecting signal through a control area network (CAN) by a voltage-difference hysteresis operation;
wherein the electric vehicle mode comprises a driving mode, a regeneration mode, a starting mode, and a charging mode;
wherein the energy storage controller forms the plurality of switch control signals of a first control mode or a third control mode according to the driving mode and the hysteresis operations, the energy storage controller forms the plurality of switch control signals of a second control mode according to the regeneration mode, the energy storage controller forms the plurality of switch controller signals of the third control mode according to the starting mode and the differential operation, and the energy storage controller forms the plurality of switch control signals of the first control mode or the third control mode according to the charging mode and the hysteresis operation.

2. The electric vehicle energy system as claimed in claim 1, wherein the first and the second power module regenerates power according to the plurality of switch control signals of the second control mode or the third control mode, and the first and the second power module periodically and alternately provides power according to the plurality of switch control signals of the first control mode.

3. The electric vehicle energy system as claimed in claim 1, wherein the first power module comprises a first battery connected to a first super capacitor in series and the second power module comprises a second super capacitor connected to a second battery in series, wherein the first battery is coupled to the second super capacitor in parallel and the second battery is coupled to the first super capacitor in parallel.

4. The electric vehicle energy system as claimed in claim 2, wherein the energy storage system further comprises:
a first switch, coupled to the first power module and the energy storage controller; and
a second switch, coupled to the second power module and the energy storage controller,
wherein the first power module comprises a first battery connected to a first super capacitor in series and the second power module comprises a second super capacitor connected to a second battery in series, wherein the first battery is coupled to the second super capacitor in parallel and the second battery is coupled to the first super capacitor in parallel;
wherein the first switch and the second switch are turned on according to the plurality of switch control signals of the third control mode such that the first battery and the second battery charge the first capacitor and the second capacitor;
wherein the first switch and the second switch are alternately turned on and off according to the plurality of switch control signals of the first control mode such that when the first power module provides power, the second power module does not provide power, and when the second power module provides power, the first power module does not provide power; and
wherein the first switch and the second switch are turned off according to the plurality of switch control signals of the second mode such that the first super capacitor and the second super capacitor are charged.

5. The electric vehicle energy system as claimed in claim 4, wherein the energy storage system further comprises a current limiter and a third switch disposed between the first power module and the second power module, and the current limiter and the third switch are activated according to the plurality of switch control signals of the second control mode or the third control mode.

6. The electric vehicle energy system as claimed in claim 4, further comprising:
a current limiter and a third switch disposed between the first power module and the second power module, wherein the current limiter and the third switch are activated according to the plurality of switch control signals of the third control mode; and
a fourth switch, connected to the current limiter in parallel, wherein the fourth switch is turned on according to the plurality of switch control signals of non-third control mode.

7. The electric vehicle energy system as claimed in claim 5, wherein the energy storage system further comprises:
a driver, coupled to the energy storage controller, for producing a plurality of energy storage driving signals, according to the plurality of switch control signals, used for driving the first switch, the second switch and the third switch.

8. The electric vehicle energy system as claimed in claim 6, wherein the energy storage system further comprises:
a driver, coupled to the energy storage controller for producing a plurality of energy storage driving signals, according to the plurality of switch control signals, used for driving the first switch, the second switch, the third switch and the fourth switch.

9. The electric vehicle energy system as claimed in claim 7 or 8, wherein the driver comprises a photo coupler.

10. The electric vehicle energy system as claimed in claim 1, further comprising:
a motor driving circuit, coupled to a motor for transforming a direct current voltage into an alternating current voltage to drive the motor according to the motor control signal; and
an electrolytic capacitor, electrically connected to the motor driving circuit in parallel for absorbing direct current pulses.

11. The electric vehicle energy system as claimed in claim 1, further comprising: a motor; wherein the motor comprises a three phase alternating current motor.

12. A method for operating an electric vehicle energy system, comprising:
producing the electric vehicle mode according to the external input signals by an electronic control unit;
producing a first detecting signal and a second detecting signal respectively according to a first power module and a second power module by a first detector and a second detector;
producing a plurality of switch control signals according to the electric vehicle mode, the first detecting signal and the second detecting signal using a voltage-difference hysteresis operation by an energy storage controller; and intermittently providing power or regenerating power according to the plurality of switch control signals by at least a first power module and a second power module;

wherein the electric vehicle mode comprises a driving mode, a regeneration mode, a starting mode, and a charging mode;

wherein producing the plurality of switch control signals comprises:

forming the plurality of switch control signals of a first control mode or a third control mode according to the driving mode and the hysteresis operation by the energy storage controller;

forming the plurality of switch control signals of a second control mode according to the regeneration mode by the energy storage controller;

forming the plurality of switch controller signals of the third control mode according to the starting mode and the differential operation by the energy storage controller; and forming the plurality of switch control signals of the first control mode or the third control mode according to the charge mode and the hysteresis operation by the energy storage controller.

13. The method for operating an electric vehicle energy system as claimed in claim 12, wherein intermittently providing power or regenerating power comprises:

regenerating power according to the plurality of switch control signals of the second control mode or the third control mode by the first power module and the second power module; and periodically and alternately providing power according to the plurality of switch control signals of the first control mode by the first power module and the second power module.

14. The method for operating an electric vehicle energy system as claimed in claim 12, wherein intermittently providing power or regenerating power comprises:

turning on a first switch and a second switch according to the plurality of switch control signals of the third control mode such that the first battery and the second battery charge the first super capacitor and the second super capacitor;

alternately turning on and off the first switch and the second switch according to the plurality of switch control signals of the first control mode such that when the first power modules provides power, the second power module does not provide power, and when the second power module provides power, the first power module does not provide power; and turning off the first switch and the second switch according to the plurality of switch control signals of the second mode such that the first super capacitor and the second super capacitor are charged.

15. The method for operating an electric vehicle energy system as claimed in claim 14, further comprising:

activating a current limiter and a third switch according to the plurality of switch control signals of the second control mode or the third control mode.

16. The method for operating an electric vehicle energy system as claimed in claim 14, further comprising:

activating a current limiter and a third switch according to the plurality of switch control signals of the third control mode; and turning on a fourth switch according to the plurality of switch control signals of non-third control mode.

17. The method for operating an electric vehicle energy system as claimed in claim 15, further comprising:

producing a plurality of energy storage driving signals according to the plurality of switch control signals by a driver, used for driving the first switch, the second switch and the third switch.

18. The method for operating an electric vehicle energy system as claimed in claim 16, further comprising:

producing a plurality of energy storage driving signals according to the switch control signals by a driver, used for driving the first switch, the second switch, the third switch and the fourth switch.

* * * * *